June 4, 1963 E. H. BETTS 3,091,963
DEVICE FOR MEASURING AND QUANTITY REGISTERING OF DRY MATERIALS
Filed Sept. 10, 1959 2 Sheets-Sheet 1
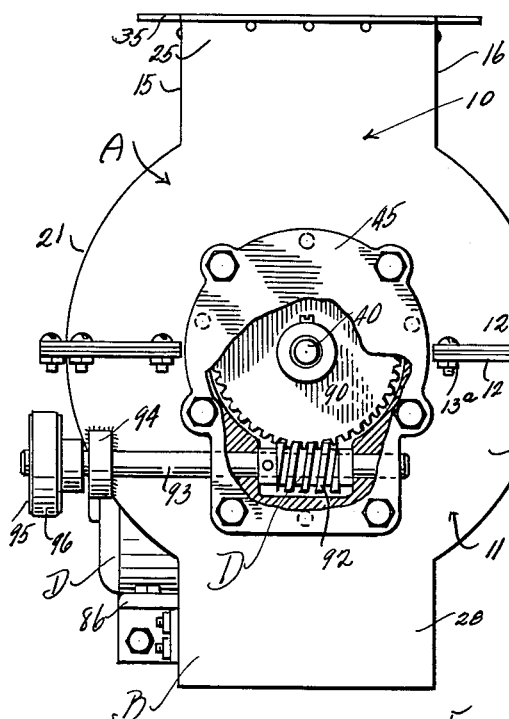
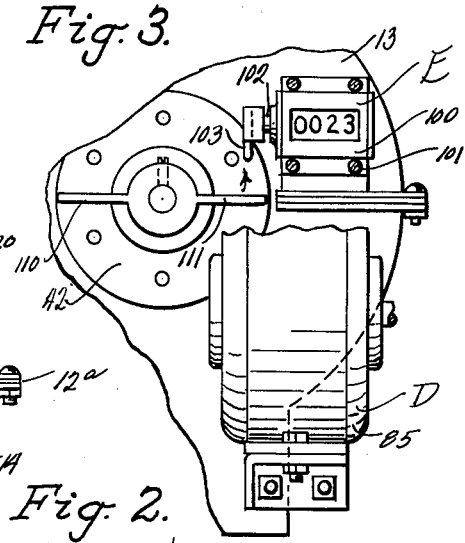
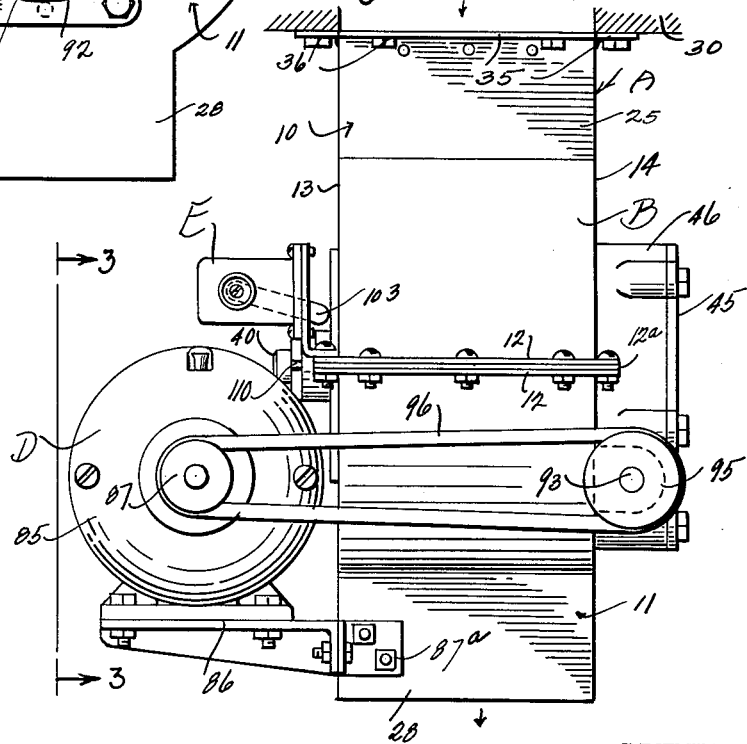
INVENTOR
ELMER H. BETTS
BY
ATTORNEYS June 4, 1963   E. H. BETTS   3,091,963
DEVICE FOR MEASURING AND QUANTITY REGISTERING OF DRY MATERIALS
Filed Sept. 10, 1959   2 Sheets-Sheet 2
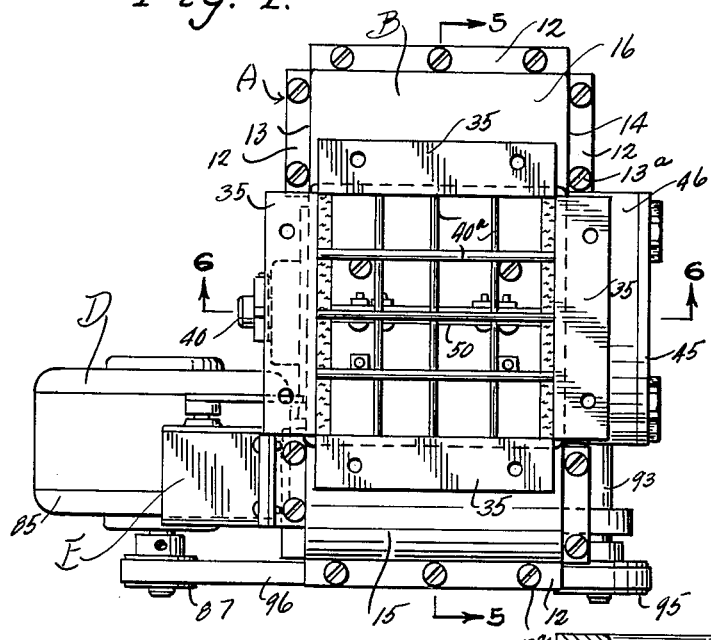
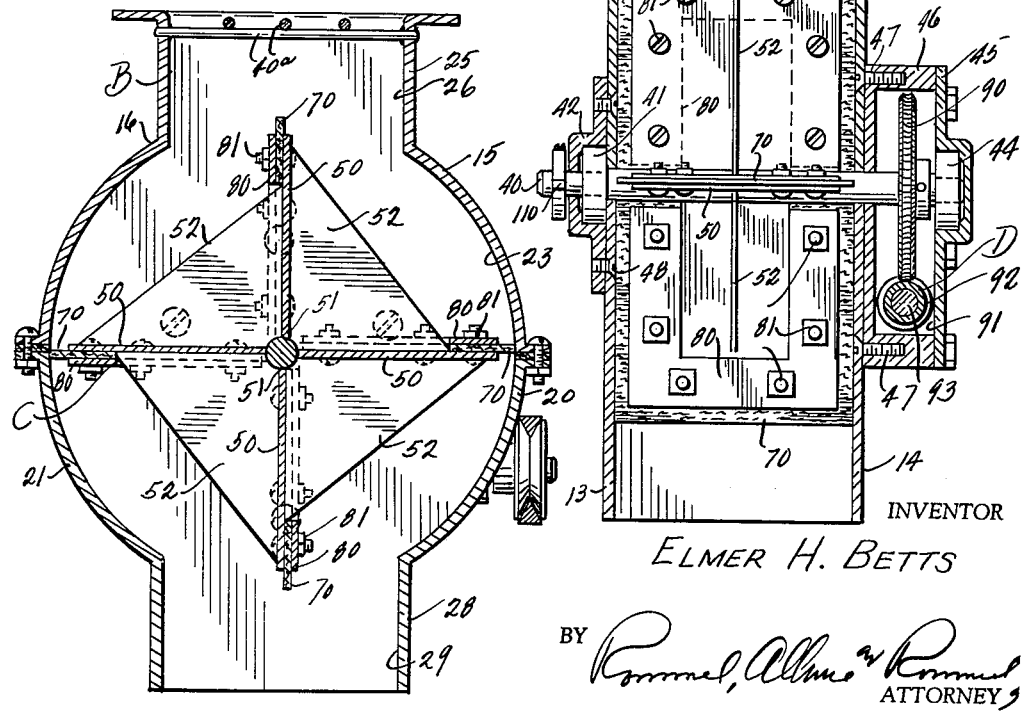
INVENTOR
ELMER H. BETTS
BY
ATTORNEYS

United States Patent Office 3,091,963
Patented June 4, 1963

3,091,963
DEVICE FOR MEASURING AND QUANTITY REGISTERING OF DRY MATERIALS
Elmer H. Betts, Millard, Nebr.
Filed Sept. 10, 1959, Ser. No. 839,137
1 Claim. (Cl. 73—218)

This invention relates to a device for the measuring and quantity registering of dry materials such as grains, cracked shell corn, wheat, rye, etc.

The primary object of this invention is the provision of a grain measuring and registering device suitable for use in various arts, but particularly in connection with the accurate registering of grain for livestock. Raisers of livestock, with the grain measuring and registering device, can properly and accurately ration livestock. This is contrary to conventional practice, since in the raising of livestock the amounts of feed given them very often are irregular from day to day. With the improved grain measuring and registering device, the owner of livestock with but little labor cost can quickly release the proper amount of grain to the livestock. To that end, the grain measuring and registering device is provided with an improved valve structure which is substantially noiseless and accurate in measuring motion; the same being motor operated, and the parts being relatively accessible for maintenance and repair.

Other objects and advantages of this invention will be apparent during the course of the following detailed description.

In the accompanying drawings, forming a part of this specification, and wherein similar reference characters designate corresponding parts throughout the several views:

FIGURE 1 is a rear elevation of the improved grain measuring and registering device, showing a part of the gear case cut away to expose the worm and worm gear drive thereof.

FIGURE 2 is a side elevational view showing the structure of the casing, the register, and the motor and drive mechanism; the view being taken at an angle 90° with respect to the view of FIGURE 1.

FIGURE 3 is a fragmentary view of the front of the device, opposite that shown in FIGURE 1, and more particularly showing the register and the drive motor.

FIGURE 4 is a plan view of the grain measuring and registering device.

FIGURE 5 is a vertical cross sectional view taken through the device substantially on the line 5—5 of FIGURE 4, and more particularly showing the casing structure and the rotatable valve assemblage.

FIGURE 6 is a vertical cross sectional view taken through the casing structure of the device but showing the rotary valve in non-sectioned elevation.

In the drawings, wherein for the purpose of illustration is shown only a preferred embodiment of the invention, the letter A may generally designate the dry granular materials measuring and registering device. It includes a casing structure B, rotatable valve assemblage C, drive means D, and register assemblage E.

Referring to the casing structure B, the same includes upper and relatively detachable sections 10 and 11, marginally flanged at their meeting ends at 12 and detachably connected together with gaskets 12a therebetween by screws or bolts 13a. The complementary sections 10 and 11, when assembled, provide a front wall 13 which is flat and an opposite rear wall 14 which is also flat. These walls 13 and 14 are shaped as shown in FIGURE 1. The side walls 15 and 16 are marginally welded to the front and rear walls 13 and 14, as shown in the drawings, and the walls 15 and 16 are bulged segmentally outwardly at 20 and 21 to define a valve receiving chamber 23 within the casing having an inlet spout 25 provided with a passageway 26 communicating with the chamber 23 (see FIGURE 5). A dumping spout 28 is also provided having a passageway 29 communicating with the chamber 23.

It is intended that the measuring and registering device be used in connection with an overhead bin or storage space, which may be generally designated at 30, as shown in sectional view FIGURE 2, and the side, front and rear walls are marginally outwardly flanged at 35 for attachment by bolt or screw means 36 to the floor of bin 30, as shown in FIGURE 2. The entrance to the passageway 26 may be provided with screen means 40a in the nature of cross bars for catching large particles of waste, such as corn cobs, etc., in order to prevent their access to the rotary valve assemblage.

The rotary valve assemblage C preferably consists of a shaft 40 rotatably supported by a bearing 41, detachably held in place by a cup-shaped plate 42, as shown in FIGURE 6. The shaft 40 extends centrally across the chamber 23 and at its end remote from the bearing 41 is provided with an anti-friction bearing 44 supported in a detachable cap 45 which constitutes part of the gear housing 46. The latter is detachably connected at 47 to the wall 14. It will be noted that the bearing supporting cap 42 is detachably connected by screws or bolts 43 to the front plate 13 of both sections 10 and 11 and that is likewise true of the gear housing 46 which is attached by the bolts 47 to the wall 14 of both sections 10 and 11.

The rotatable valve assemblage C furthermore consists of four vane plates 50 spaced in planes 90° apart and welded at their proximate ends at 51 to the shaft 40 radially thereof. If desired, the vanes 50 may be detachably keyed to the shaft 40. The vanes 50 are disposed in the chamber 23 and are of such size that their marginal side and outer edges will not contact the walls of the casing B as will be noted from FIGURE 6. In order to stabilize the position of the vanes 50, I provide gusset plates 52 which are welded to the proximate facing surfaces of the vanes, in the position shown in FIGURE 5; these gussets 52 being triangularly shaped in the form of isosceles triangles with base and altitude edges of unequal lengths. The gusset plates are centrally disposed between the sides of the vanes although more than one gusset plate can be used for each of the vanes if so desired.

In order to render the rotatable valve assemblage as accurate as possible in measurement and to provide for substantially noiseless operation, I prefer to provide U-shaped strips of rubberized or flexible plastic material marginally projecting beyond the side and top edges of each of the vanes 50 for contact at their marginal edges with surfacing of the walls 13 and 14 and the chamber providing bulges 20 and 21. The U-shaped sealing elements 70 are held in place against the vanes 50 in the position shown in FIGURE 6 of the drawing by U-shaped metal plates 80 which are detachably connected by bolts 81 to the vanes.

Referring to the drive means D, an electric motor 85 is detachably supported upon a base 86 which in turn is detachably connected at 87a to the casing structure B facing the wall 13. It includes a drive pulley 87. On the shaft 40 is keyed a worm gear or wheel 90 disposed in the chamber 91 of the housing 46. Gear 90 meshes with a worm 92 keyed upon a shaft 93 rotatably supported by the gearing housing, as shown in FIGURE 1. The shaft 93 may have additional bearings as shown at 94 to stabilize the position of the same, at its outer end it is provided with a pulley 95. The pulleys 87 and 95 are preferably of the V-grooved type to receive a V-type belt 96. The motor 85 drives the belt 96 which, through the worm and worm gearing above described, drives the shaft 40 and the entire rotatable valve assemblage within the chamber 23 will rotate.

The gear compartment 91 will be oil filled.

A conventional counter or register 100 of the assemblage E is bolted or otherwise secured at 101 upon the wall 13 of the casing structure; the same having an operating shaft 102 provided with a radially extending contact arm 103. The end of the rotor shaft 40 opposite the gearing is provided with a pair of trip arms 110 and 111 in position to engage the arm 103 of the register for the purpose of actuating the register and counting the quantity of grain dispensed by the rotary valve assemblage.

It is contemplate that, for stock feeding purposes, the volume of grain entering each compartment between adjacent vanes 50 will constitute one half bushel. Thus, during a complete rotation of the rotary valve assemblage, two bushels of grain or other dry granular materials will be dispensed through the exit spout 28, and these two bushels will be registered upon the counter 100.

All parts of the casing structure are preferably of metal with the exception of the gasket 12ª between the flanges holding the sections 11 and 12 together and the gear box is preferably of metal. The rotatable valve assemblage, while preferably of metal except for the sealing elements 70, may be constructed of plastic if found suitable.

Various changes in the size, shape and arrangement of parts may be made to the form of invention herein shown and described, without departing from the spirit of the invention or scope of the claim.

I claim:

In a dry granular materials measuring and dispensing device, the combination of a casing having a chamber therein provided with entrance and exit passageways thereto, a shaft rotatably supported by said casing extending centrally through said chamber, power means on the casing for driving the shaft, rigid vanes secured to the shaft in the chamber, said vanes being endwise and laterally spaced from the surfaces defining said chamber, U-shaped sealing members for each of said vanes of a size which when applied to said vanes project beyond the side and outer edges of each of said vanes and engage the facing surfaces of said chamber, U-shaped metal plates secured to said vanes clamping said U-shaped sealing members in such position, and gusset plates welded to said vanes in right angled relation thereto, each gusset plate being welded to the facing sides of adjacent vanes.

References Cited in the file of this patent

UNITED STATES PATENTS

| | | |
|---|---|---|
| 533,255 | Warner | Jan. 29, 1895 |
| 1,575,782 | Mowry | Mar. 9, 1926 |
| 1,811,898 | Schur et al. | June 30, 1931 |
| 1,878,922 | Wessman | Sept. 20, 1932 |